United States Patent
Smith et al.

(10) Patent No.: US 11,023,006 B2
(45) Date of Patent: Jun. 1, 2021

(54) DOCKING SUPPORT BAR

(71) Applicant: Lenovo (Singapore) Pte. Ltd., Singapore (SG)

(72) Inventors: Madison Kay Smith, Manhattan Beach, CA (US); Cuong Huy Truong, Cary, NC (US); Brian Hargrove Leonard, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 128 days.

(21) Appl. No.: 16/389,979

(22) Filed: Apr. 21, 2019

(65) Prior Publication Data

US 2020/0333838 A1 Oct. 22, 2020

(51) Int. Cl.
*G06F 1/16* (2006.01)
*H05K 5/00* (2006.01)
*H05K 7/00* (2006.01)
*H04M 1/04* (2006.01)

(52) U.S. Cl.
CPC .......... *G06F 1/1632* (2013.01); *G06F 1/1635* (2013.01); *H04M 1/04* (2013.01)

(58) Field of Classification Search
CPC ....... G06F 1/1632; G06F 1/1635; H04M 1/04
See application file for complete search history.

(56) References Cited

U.S. PATENT DOCUMENTS

| | | | |
|---|---|---|---|
| 8,634,188 B2 * | 1/2014 | Haren | G06F 1/1632 361/679.41 |
| 8,724,312 B2 * | 5/2014 | Jones | G06F 1/1632 361/679.44 |
| 9,740,237 B2 * | 8/2017 | Moore | G06F 1/1632 |
| 10,405,440 B2 * | 9/2019 | Burdoucci | H04M 1/185 |
| 10,503,207 B1 * | 12/2019 | Knoppert | G06F 1/1681 |
| 2013/0070408 A1 * | 3/2013 | Shen | G06F 1/1632 361/679.27 |
| 2016/0294113 A1 * | 10/2016 | Mehandjiysky | H01R 13/6205 |

* cited by examiner

*Primary Examiner* — Anthony M Haughton
(74) *Attorney, Agent, or Firm* — Ference & Associates LLC

(57) ABSTRACT

One embodiment provides a method, including: displaying, on an information handling device, content, wherein the content is displayed across a first surface and a second surface of the information handling device; detecting, using a processor, attachment of a removable keyboard to one of: the first surface or the second surface; and adjusting, based on the detecting, a screen configuration of the content. Other aspects are described and claimed.

20 Claims, 4 Drawing Sheets

DOCKING SUPPORT BAR

BACKGROUND

A docking station, or "dock", may refer to any system with the capacity to accommodate an information handling device ("device"), for example, a smart phone, a tablet, another media playing device, and the like, to playback media stored on the device, facilitate data transfer from the device to another device, and/or to charge a battery of the device. The dock may be an independent dock (i.e., dedicated to charging/connecting one or more devices) or may be a component of a larger device or system.

BRIEF SUMMARY

In summary, one aspect provides a method, comprising: detecting, at a docking station of an electronic device, connection of another electronic device; and deploying, responsive to the detecting and using a deployment mechanism, a support bar.

Another aspect provides an information handling device, comprising: a processor; a docking station; a support bar; a deployment mechanism; a memory device that stores instructions executable by the processor to: detect connection of another electronic device to the docking station; and deploy, responsive to the detecting and using the deployment mechanism, the support bar.

A further aspect provides an electronic device, comprising: a docking station; a support bar; and a deployment mechanism configured to raise the support bar responsive to detection of a connection between the docking station and another electronic device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
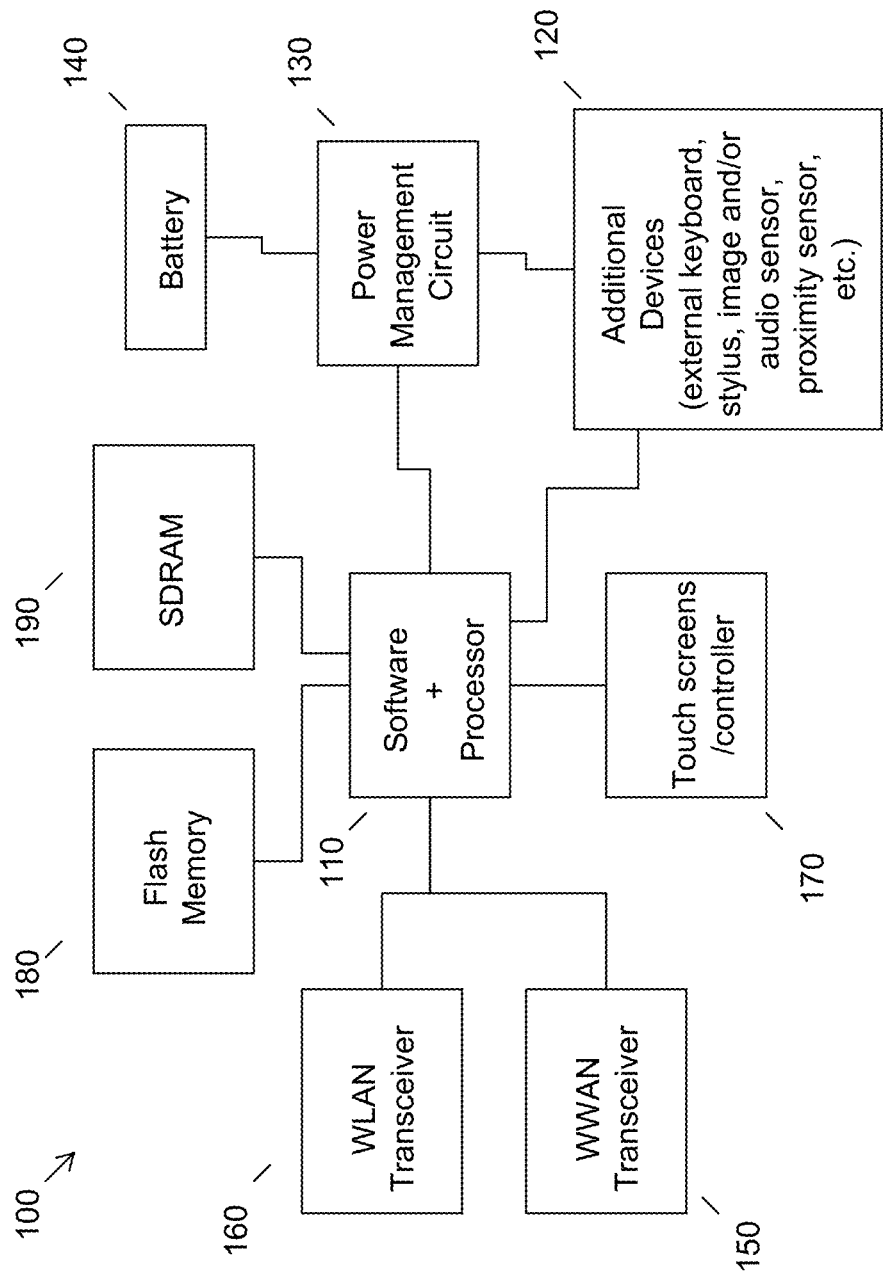
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Advances in docking station design allow for modern devices to be vertically docked. More particularly, a port may be located on the bottom of the device that may interface with a docking connector of the docking station. The vertical docking orientation may allow a user to more easily visualize contents on their device while it is docked and may also be more visually appealing to a user than a conventional horizontal docking orientation. A real-world example of a vertically docked device may include a smart phone that connects to a speaker system.

When a device is vertically and/or horizontally docked it needs appropriate back support to pass a tilt test and not create strain on the docking connector (e.g., produced by the device leaning too far backward, etc.). If strain is created, the connection between the docking connector and the device may be severed. A severed connection may not only prevent the device from receiving a charge, but may also interrupt any data transfer occurring between the device and the docking device (e.g., a severed connection may interrupt media being played through a speaker system that is received from a docked device, etc.). Additionally, frequent or severe strain placed on the docking connector may result in damage to the docking connector, thereby hampering subsequent instances of device docking.

Presently, docking stations exist that provide back supports for docked devices. However, the back supports of these docking stations are rigid and integrated into the underlying design of the docking device. Stated differently, conventional docking devices maintain the back support component even when a device is not connected to the docking connector. This may be visually unappealing to a user and/or may create design limitations.

Accordingly, an embodiment provides a docking device that includes a dynamically deployable support bar. In an embodiment, responsive to the detection of a connection between a docking station of a device and a port of another device (e.g., a smart phone, etc.), an embodiment may deploy a support bar (e.g., from within a housing of the device, etc.) behind the docked device that is configured to provide stabilizing support for the docked device to prevent it from tilting. When the docked device is disconnected, an embodiment may thereafter retract the support bar (e.g., into the housing of the device, etc.) so that it is no longer apparently visible. Such a method and device may prevent strain from being placed on a docking connector and may also only deploy in a necessary situation.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., image and/or audio capture devices such as camera sensors and microphone respectively, other connectable devices, etc. System 100 often includes one or more touch screens 170 for data input and display/rendering. System 100 also typically includes various memory devices, for example flash memory 180 and SDRAM 190.

Figure 2:
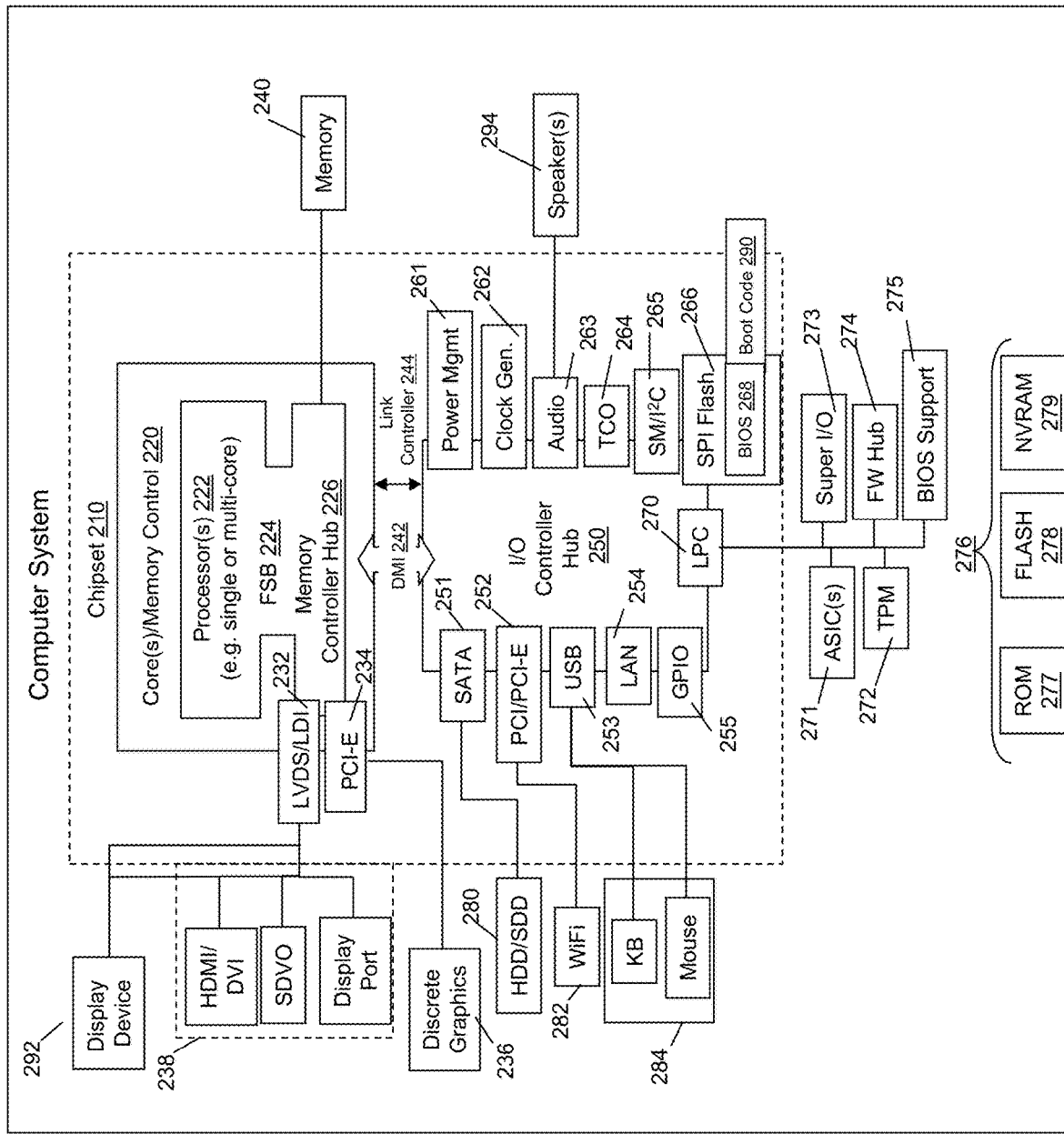
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD and/or YOGA series of personal computers/electronics sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices comprising at least one docking station such as a dedicated docking device and/or other multi-purpose electronic devices that may comprise a docking station such as a speaker, a display device (e.g., a TV, etc.), a gaming console, another type of computing device, and the like.

Figure 3:
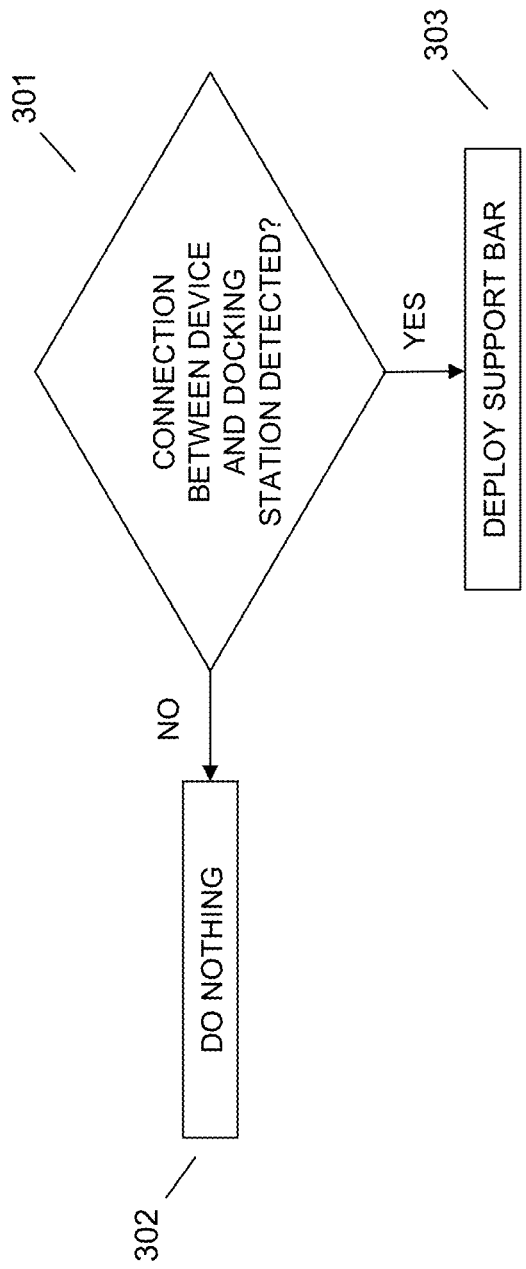
FIG. 3 illustrates an example method of deploying a support bar.

Referring now to FIG. 3, an embodiment provides a dynamically deployable support bar configured to prevent a docked device from tilting. At 301, an embodiment may detect whether a connection has been established between a docking station of a device and another device. In this respect, an embodiment may detect whether a docking connector of the device has interfaced with a port of another device. In an embodiment, the detection may be identified via detecting that an electrical connection has been established with the docking connector. Additionally or alternatively, an embodiment may use one or more other sensors (e.g., camera sensors, proximity sensors, etc.) and/or mechanical switches to confirm detection of another device.

In an embodiment, the device may be a dedicated docking station (e.g., a dedicated charging device capable of connecting and charging one or more other electronic devices, etc.). Alternatively, in another embodiment, the device may be an electronic device comprising one or more docking stations (e.g., a speaker, a console, a computing device, etc.). In an embodiment, the docking station may be positioned and/or configured to enable vertical and/or horizontal docking of another device. For example, the docking station may be positioned on a level, open-air surface of the device (e.g., a top surface of the device, etc.). As a non-limiting example and with reference to FIG. 4A, a speaker 40 may comprise a docking station 41 located on a top surface 42 of the speaker 40.

Responsive to detecting, at 301, that a connection has not been established, an embodiment may, at 302, take no additional action. Conversely, responsive to detecting, at 301, that a connection has been established, an embodiment may, at 303, deploy a support bar from the docking device configured to support the docked device.

In an embodiment, the support bar may be composed of a rubber material, a plastic material, a metal material, a combination thereof, etc. In an embodiment, the support bar may be formed to be one of a variety of different conventional shapes (e.g., substantially rectangular shaped, substantially oval shaped, etc.). Alternatively, the support bar may be formed to mimic the shape of a particular device (e.g., a particular smart phone, a particular media-playing device, etc.). In an embodiment, the support bar may be completely solid, or alternatively, may comprise one or more hollow portions. To an extent, the shape and fill of the support bar may be a design choice.

In an embodiment, the support bar, prior to deployment, may be originally maintained in a lower position. For example, the entirety of the support bar, or majority thereof, may be stored inside a housing of the device. As another example, the support bar may be positioned flat against the surface of the docking device. Responsive to receiving an indication to deploy, the support bar may be raised from the lower position to an elevated position. In the elevated position, the support bar may protrude up from the docking device in a perpendicular direction. Additionally, the support bar in the elevated position may be angled to a degree that prevents a docked device from tilting more than a predetermined amount. In this regard, the degree the support bar is angled is a degree that ensures that the docked device resting against the support bar maintains a secure connection with the docking connector of the docking station.

In an embodiment, the support bar may be automatically deployed using a deployment mechanism. In an embodiment, the deployment mechanism may be a conventional fold mechanism (e.g., where the support bar folds up to an elevated position, etc.), a pivot mechanism (e.g., where the support bar pivots around a joint to an elevated position, etc.), a slide mechanism (e.g., where the support bar is slid up to an elevated position using an upward sliding force, etc.), a spring mechanism (e.g., where the support bar is launched to the elevated position from a loaded spring, etc.), and a gear/motor mechanism (e.g., one or more gears and/or motors may be used to drive the support bar to the elevated position, etc.). Alternatively, the support bar may be configured to be manually raised and lowered by a user (e.g., by interaction with a top portion of the support bar, by interaction with a handling portion of the support bar, etc.).

In an embodiment, the indication to deploy the support bar using the deployment mechanism may be provided either by an electronic signal or by mechanical means. With respect to a signal indication, an embodiment may detect connection of another device to the docking connector and thereafter send a signal to a controller to elevate the support bar (e.g., by using one or more motors, etc.). Alternatively, one or more mechanical switches may be positioned around the docking connector and may be flipped when another device docks to the docking station. The flipping of these switches may activate a mechanical deployment mechanism to raise the support bar to the elevated position.

Figure 4B:
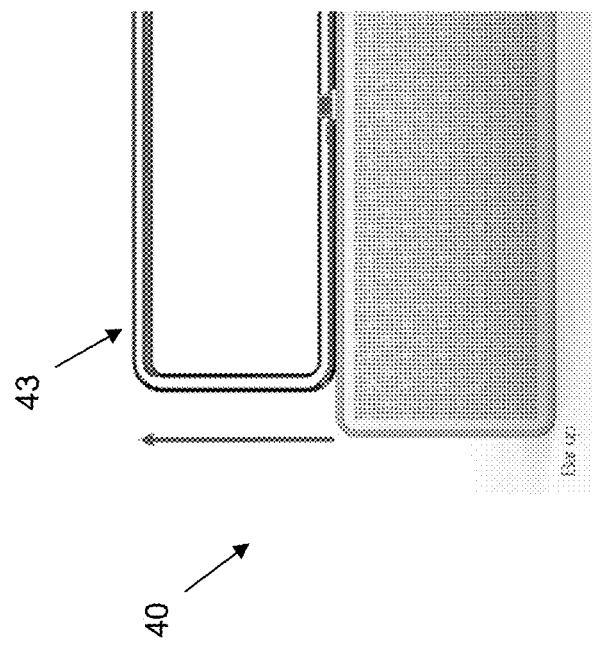
FIG. 4(A-B) illustrates an example embodiment of support bar deployment.
Figure 4A:
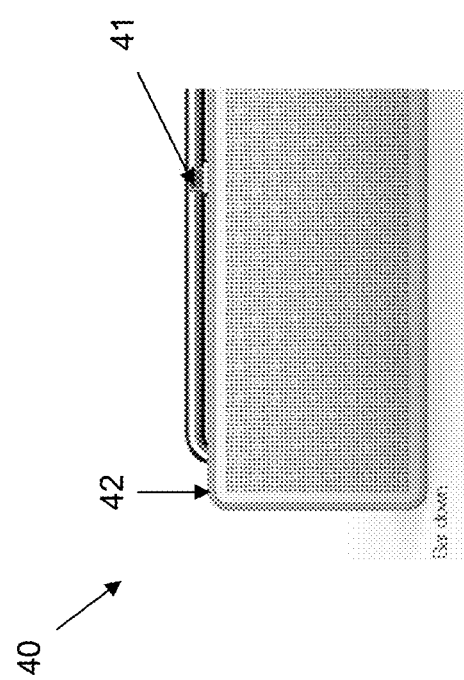

As a non-limiting example of the foregoing embodiments and with reference to FIG. 4B, a support bar 43 in an elevated position is illustrated. As can be seen from the figure, the support bar 43 protrudes upwards from the device 40 in a perpendicular direction and may provide back support for a docked device (not illustrated).

In an embodiment, the support bar may be retracted responsive to the detection of one or more factors. For example, in an embodiment, the support bar may be retracted responsive to detecting that the connection between the docking connector and a port of the other device has been severed (e.g., by a user removing the other device from the docking station, etc.). As another example, the support bar may be retracted responsive to detecting that the connection between the docking connector and the port of the other device has been established for a predetermined period of time (e.g., 30 minutes, 1 hour, 5 hours, etc.). In yet another example, the support bar may be retracted responsive to detecting that a connected device has obtained a predetermined level of charge (e.g., 75%, 90%, 100%, etc.). In an embodiment, the support bar may be retracted using the deployment mechanism or may be retracted using another mechanism.

The various embodiments described herein thus represent a technical improvement to conventional docked device securement techniques. Using the techniques described herein, an embodiment may detect when another device connects to a docking station of a device. An embodiment may thereafter deploy a support bar that is configured to support the docked device in the docked position so as not to put strain on the docking connector. Such a method and device ensures that docked devices maintain a proper docking connection.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, at a docking station positioned on a top surface of an electronic device, vertical connection of another electronic device, wherein the detecting comprises identifying that an electrical connection is established between a docking connector of the docking station and a port of the another electronic device; and
   deploying, from a position on the docking station behind the docking connector and responsive to the detecting and using a deployment mechanism, a support bar from within the docking station to a raised position above the docking station;
   wherein the support part bar is not connected to the another electronic device.

2. The method of claim 1, wherein the another electronic device is an electronic device selected from the group consisting of a smart phone, a tablet, and a media playing device.

3. The method of claim 1, wherein the support bar is configured to maintain a docked position of the connected another electronic device.

4. The method of claim 1, wherein the deploying comprises deploying the support bar in a perpendicular direction to the electronic device.

5. The method of claim 1, wherein the deploying comprises deploying the support bar from within the housing of the electronic device.

6. The method of claim 1, wherein the deployment mechanism is selected from the group consisting of a fold mechanism, a pivot mechanism, a slide mechanism, and a spring mechanism.

7. The method of claim 1, further comprising retracting the support bar responsive to detecting that the connection between the docking station and the another electronic device is broken.

8. The method of claim 1, further comprising retracting the support bar responsive to detecting that the another electronic device was connected to the docking station for a predetermined time period.

9. The method of claim 1, wherein the support bar is composed of a material selected from the group consisting of a plastic material, a rubber material, and a metal material.

10. The method of claim 1, further comprising charging the another electronic device via the connection.

11. An information handling device, comprising:
    a processor;
    a docking station positioned on a top surface of the information handling device;
    a support bar;
    a deployment mechanism;
    a memory device that stores instructions executable by the processor to:
    detect vertical connection of another electronic device to the docking station, wherein the detecting comprises identifying that an electrical connection is established between a docking connector of the docking station and a port of the another electronic device; and
    deploy, from a position on the docking station behind the docking connector and responsive to the detecting and using the deployment mechanism, the support bar from within the docking station to a raised position above the docking station;
    wherein the support bar is not connected to the another electronic device.

12. The information handling device of claim 11, wherein the another electronic device is an electronic device selected from the group consisting of a smart phone, a tablet, and a media playing device.

13. The information handling device of claim 11, wherein the support bar is configured to maintain a docked position of the connected another electronic device.

14. The information handling device of claim 11, wherein the support bar is deployed in a perpendicular direction to the information handling device.

15. The information handling device of claim 11, wherein the support bar is deployed from within the housing of the information handling device.

16. The information handling device of claim 11, wherein the deployment mechanism is selected from the group consisting of a fold mechanism, a pivot mechanism, a slide mechanism, and a spring mechanism.

17. The information handling device of claim 11, wherein the instructions are further executable by the processor to retract the support bar responsive to detecting that the connection between the docking station and the another electronic device is broken.

18. The information handling device of claim 11, wherein the instructions are further executable by the processor to retract the support bar responsive to detecting that the another electronic device was connected to the charging connector for a predetermined time period.

19. The information handling device of claim 11, wherein the support bar is composed of a material selected from the group consisting of a plastic material, a rubber material, and a metal material.

20. An electronic device, comprising:
- a docking station positioned on a top surface of the electronic device, wherein the docking station comprises a docking connector;
- a support bar located at a position behind the docking connector on the docking station; and
- a deployment mechanism configured to raise the support bar responsive to detection of a connection between the docking station and another electronic device;
- wherein the support bar is not connected to the another electronic device.

* * * * *